(12) United States Patent
Chew et al.

(10) Patent No.: US 9,065,770 B2
(45) Date of Patent: Jun. 23, 2015

(54) TRAFFIC ITEM IMPAIRMENT EMULATION

(75) Inventors: Earl Chew, Vancouver (CA); Michael Hutchison, Richmond (CA); Noah Gintis, Westlake Village, CA (US)

(73) Assignee: Ixia, Calabasas, CA (US)

( * ) Notice: Subject to any disclaimer, the term of this patent is extended or adjusted under 35 U.S.C. 154(b) by 165 days.

(21) Appl. No.: 13/228,291

(22) Filed: Sep. 8, 2011

(65) Prior Publication Data

US 2013/0064095 A1    Mar. 14, 2013

(51) Int. Cl.
*H04L 12/26* (2006.01)
*H04L 12/24* (2006.01)

(52) U.S. Cl.
CPC .......... *H04L 43/50* (2013.01); *H04L 41/20* (2013.01); *H04L 43/026* (2013.01); *H04L 43/028* (2013.01); *H04L 41/22* (2013.01)

(58) Field of Classification Search
USPC ........................................................ 370/241
See application file for complete search history.

(56) References Cited

U.S. PATENT DOCUMENTS

| | | |
|---|---|---|
| 6,246,684 B1 | 6/2001 | Chapman et al. |
| 6,625,689 B2 * | 9/2003 | Narad et al. ............ 711/110 |
| 6,717,917 B1 * | 4/2004 | Weissberger et al. ...... 370/252 |
| 7,593,345 B2 | 9/2009 | Dubé et al. |
| 7,633,939 B2 | 12/2009 | Curran-Gray et al. |
| 7,751,449 B2 | 7/2010 | Winters |
| 2006/0088060 A1 * | 4/2006 | Fujikami et al. ............ 370/474 |
| 2006/0109796 A1 * | 5/2006 | Koptiw et al. ............ 370/252 |
| 2006/0256720 A1 * | 11/2006 | Curran-Gray et al. ....... 370/235 |
| 2009/0003207 A1 * | 1/2009 | Elliott ................... 370/230.1 |

OTHER PUBLICATIONS

Spirent Communications, Spirent GEM Ethernet Network Impairment Emulators, Network Playback Module for CES, TOP, MEF-18, G.8261, article, http://www.spirent.com/~/media/Datasheets/Broadband/PAB/GEM_Impairments/GEM_NW_Playback_Module_for_CES_TOP_MEF-18_G8261_Datasheet.pdf, accessed Jan. 17, 2012. pp. 1-4.
Anonymous, Spirent XGEM 10Gigabit Ethernet Multi-Profile Network and Impairment Emulator V3.1, User Guide, Spirent Communications, Mar. 2009, document No. XP-002693593, pp. 1-211.

* cited by examiner

*Primary Examiner* — Yemane Mesfin
*Assistant Examiner* — Jeff Banthrongsack
(74) *Attorney, Agent, or Firm* — SoCal IP Law Group LLP; John E. Gunther; Steven C. Sereboff

(57) ABSTRACT

An impairment unit, method, and machine readable storage media for emulating network impairments. A first network interface may receive network traffic including a plurality of received packets. A classifier may determine an impairment class of each received packet based on test information contained within a payload portion of each received packet, the impairment class of each received packet being one of a plurality of impairment classes, each impairment class uniquely associated with a corresponding one of a plurality of impairment profiles. An impairment engine may impair each of the plurality of impairment classes in accordance with the corresponding impairment profile to provide impaired network traffic. A second network interface may transmit the impaired network traffic to the network.

23 Claims, 8 Drawing Sheets

(c) 2011 Ixia

TRAFFIC ITEM IMPAIRMENT EMULATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating connections for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol (IP) version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be a source of test traffic, a destination for test traffic, or both a source of and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

In order to test the capability of a network to survive or overcome a failure or other condition that impairs the performance of the network, impairments may be controllably introduced into the network. For example, voice over internet protocol (VoIP) networks may execute packet loss concealment strategies to replace packets that are lost during transmission over the network. To test such capability, a programmable impairment unit may be introduced into the network to cause a controlled number of packets to be dropped during transmission. An impairment unit may introduce other forms of impairment such as, for example, delaying packets for a fixed or randomly variable time period, reordering packets, introducing bit errors, duplicating packets, and other impairments.

For the purpose of collecting test data, the test traffic for each traffic item may be organized into packet groups, where a "packet group" is any plurality of packets for which network traffic statistics are accumulated. The packets in a given packet group may be distinguished by a packet group identifier (PGID) contained in each packet. The PGID may be, for example, a dedicated identifier field or combination of two or more fields within each packet.

For the purpose of reporting network traffic data, the test traffic for each traffic item may be organized into flows, where a "flow" is any plurality of packets for which network traffic statistics are reported. Each flow may consist of a single packet group or a small plurality of packet groups. Each packet group may typically belong to a single flow.

Within this description, the term "logic circuit" means a collection of hardware, which may be augmented by firmware and/or software, which performs a described function or set of functions. The term "logic circuit" encompasses combinatorial logic and sequential logic such as, for example, state machines. All or portions of a "logic circuit" may be implemented by a micro-controller or other processor. Logic circuits may typically be designed using a hardware description language (HDL) that defines the logic circuits primarily in functional terms. The HDL design may be verified using an HDL simulation tool. The verified HDL design may then be converted into a gate netlist or other physical description of the logic circuits in a process commonly termed "synthesis". The synthesis may be performed automatically using a synthesis tool. The gate netlist or other physical description may be converted into process instructions and masks for fabricating the engine within an application specific integrated circuit (ASIC).

A gate netlist or other physical description of logic circuits may be further converted into configuration data for implementing the logic circuits in a field programmable gate array (FPGA), a programmable logic device (PLD), or a programmable logic arrays (PLA), or other programmable semiconductor device, all of which will be referred to herein as "programmable circuit devices". Configuration data for programming a programmable circuit device may be stored in a memory or a machine readable storage medium and used to configure a programmable circuit device upon power-up of a test system. In this patent, the term "machine readable storage medium" means a physical medium for storing digital data. Examples of machine readable storage media include optical discs such as CD-ROM, CD-RW, and DVD discs; magnetic medium such as hard and flexible magnetic discs and magnetic tape; and nonvolatile semiconductor devices such as read-only and flash memories. The term "machine readable storage medium" is not intended to encompass transitory media such as signals and waveforms that may convey digital data.

Within this description, the terms "unit" and "engine" also means collections of hardware, which may be augmented by firmware and/or software, which may be on a larger scale or have a more focused function than a "logic circuit". The terms "logic circuit", "unit" and "engine" do not imply any physical separation or demarcation. All or portions of one or more logic circuits, units, and/or engines may be collocated on a common card, such as a network card, or within a common programmable circuit device, ASIC, or other circuit device.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
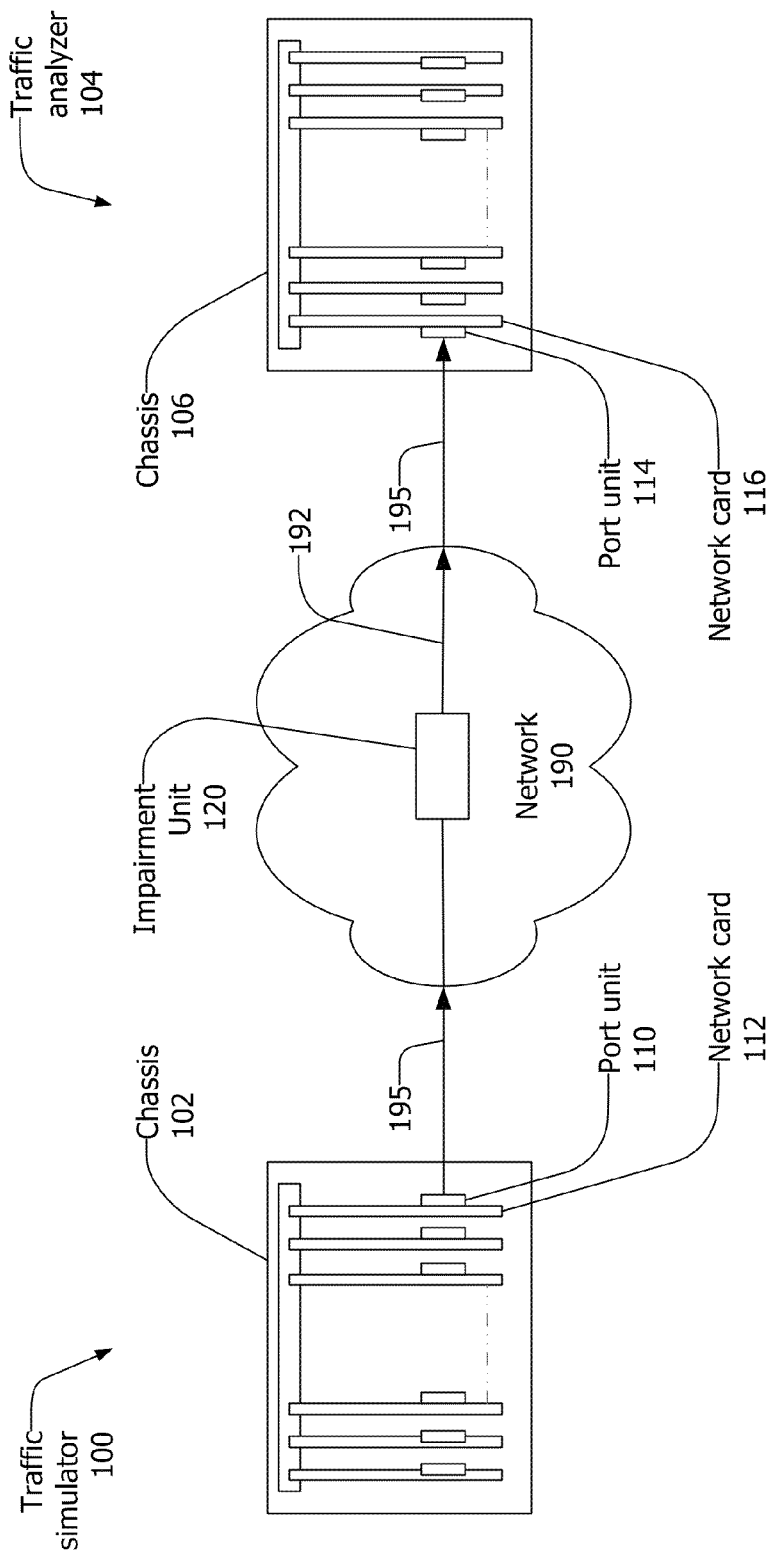
FIG. 1 is a block diagram of a network test environment.

FIG. 1 shows a block diagram of a network test environment. The network test environment may include a traffic simulator 100, a traffic analyzer 104, and a network 190. One or more impairment units 120 may be introduced into the network 190. The traffic simulator 100 may generate test traffic that is received by the traffic analyzer 104 via the network 190. The traffic simulator 100 and the traffic analyzer 104 may be separate physical units, as shown, or may be combined in a single unit the both generates and receives test traffic.

The traffic simulator 100 may be a network test device, performance analyzer, conformance validation system, network analyzer, or network management system. The traffic simulator 100 may be a portion of the network 190 or a device within the network 190 performing self-testing. The traffic simulator 100 may include one or more network cards 112 enclosed within a chassis 102. The chassis 102 may be a fixed or portable chassis, cabinet, or enclosure suitable to contain the network test equipment. The traffic simulator 100 may be an integrated unit, as shown in FIG. 1. Alternatively, the traffic simulator 100 may comprise a number of separate units cooperative to provide traffic generation and/or analysis.

The traffic analyzer 104 may be a network test device, performance analyzer, conformance validation system, network analyzer, or network management system. The traffic analyzer 104 may be a portion of the network 190 or a device within the network 190 performing self-testing. The traffic analyzer 104 may include one or more network cards 116 enclosed within a chassis 106. The chassis 106 may be a fixed or portable chassis, cabinet, or enclosure suitable to contain the network test equipment. The traffic analyzer 104 may be an integrated unit, as shown in FIG. 1. Alternatively, the traffic analyzer 104 may comprise a number of separate units cooperative to provide traffic generation and/or analysis.

The network cards 112/116 may be permanently installed in the traffic simulator 100 and traffic analyzer 104 or may be removable. The network cards 112/116 may include one or more field programmable gate arrays (FPGAs), application specific integrated circuits (ASICs), programmable logic devices (PLDs), programmable logic arrays (PLAs), processors, and other kinds of programmable circuit devices. In addition, the network cards 112/116 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards.

Each network card 112/116 may contain one or more port unit 110/114. Each port unit 110/114 may connect to the network 190 through one or more ports. Each port unit 110/114 may be connected to the network 190 through a communications link 195, which may be a wire, an optical fiber, a wireless link, or other communications link. Each network card 112/116 may support a single communications protocol, may support a number of related protocols, or may support a number of unrelated protocols.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein collectively as "traffic" and individually as "packets". The network 190 may be comprised of numerous nodes interconnected by a mesh of communications paths, providing numerous physical and logical paths for data to travel. There may be plural logical communications paths between the traffic simulator 100 and the traffic analyzer 104.

The impairment unit 120 may be a separate physical device or a portion of one of the traffic simulator 100 and the traffic analyzer 104. The impairment unit 120 may be remotely located from the traffic simulator 100 and/or the traffic analyzer 104. The impairment unit 120 may be introduced into a designated communications path 192 within the network 190 such that at least some of the traffic from the traffic simulator 100 to the traffic analyzer 104 flows through the impairment unit 120. The impairment unit 120 may selectively impair some or all of the traffic that flows along the designated communications path 192. For example, the impairment unit 120 may selectively drop, delay, reorder, duplicate, and/or alter at least some packets that flow along the designated communications path 192.

The designated communications path 192 may be unidirectional, as shown in FIG. 1, or may be bidirectional. If the designated communications path 192 is bidirectional, the impairment unit 120 may be configured to selectively impair packets traveling in either direction (i.e. from left-to-right or right-to-left as shown in FIG. 1) along the designated communications path.

Figure 2:
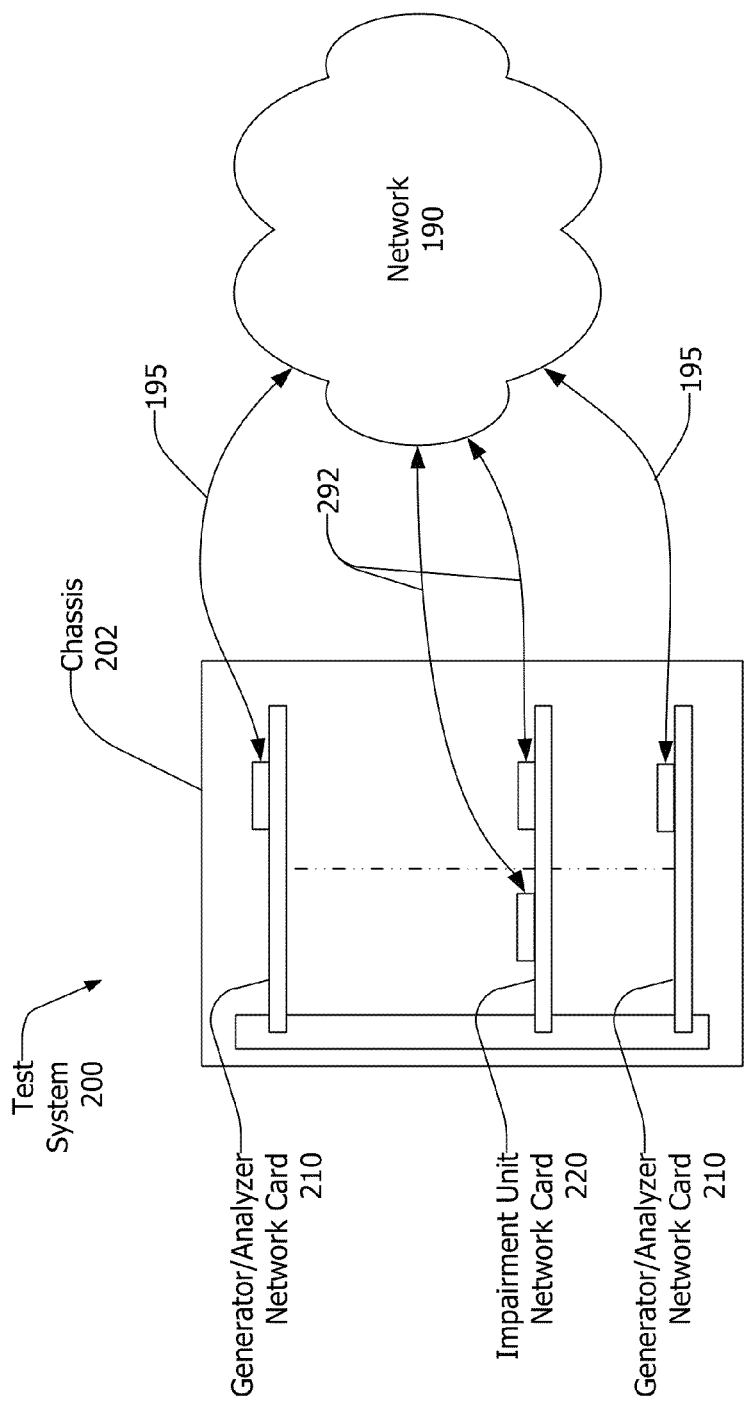
FIG. 2 is a block diagram of a network test environment.

Referring now to FIG. 2, another network test environment may include a test system 200 coupled to the network 190. The test system 200 may include a plurality of generator/analyzer network cards 210 enclosed within a chassis 202. Each generator/analyzer network card 210 may include one or more port units connected to the network 190 via respective bidirectional communications links 195. At least some of the generator/analyzer network cards 210 may generate test traffic for transmission via the network 190. At least some of the generator/analyzer network cards 210 may receive and analyze test traffic from the network 190. Some or all of the generator/analyzer network cards 210 may both generate and analyze test traffic. The plurality of generator/analyzer network cards 210 may collectively perform the functions of the traffic simulator 100 and traffic analyzer 104 of FIG. 1.

The test system 200 may include one or more impairment unit network cards 220. The impairment unit network card 220 may include two ports connected to the network 190 by a pair of communications links 292. In effect, a designated communications path within the network 190 may be broken and connected to the two ports of the impairment unit network card 220. The communications links 292 may be unidirectional or bidirectional, in which case the impairment unit network card 220 may be configured to selectively impair packets traveling in either or both directions.

Figure 3:
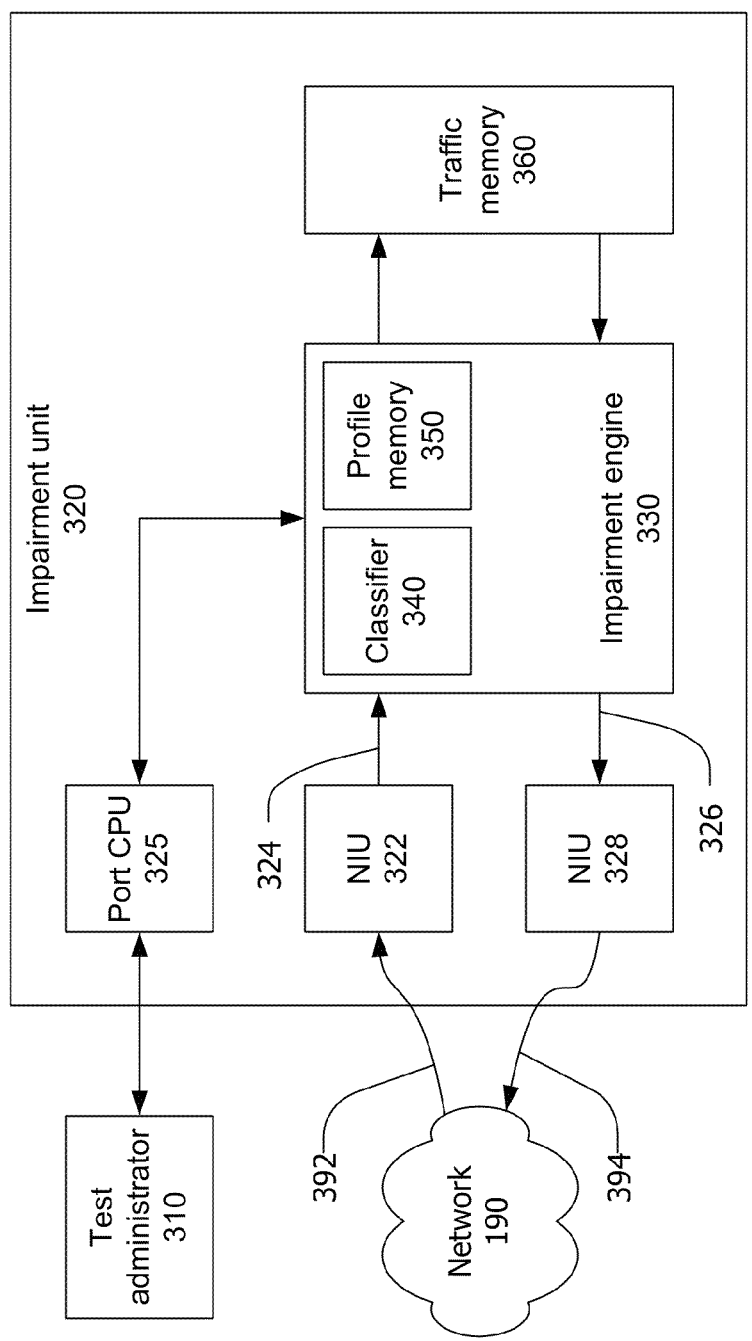
FIG. 3 is a block diagram of an impairment unit.

Referring now to FIG. 3, an impairment unit 320, which may be the impairment unit 120 or 220, may be coupled to the network 190 by two communications links 392, 394. The communications links 392, 394 which may be wires, optical fibers, wireless links, or other communication links. The impairment unit 320 may include a first network interface unit (NIU) 322, a second NIU 328, an impairment engine 330, a port central processing unit (CPU) 325, and a traffic memory 360.

The first NIU 322 may receive electrical, optical, or wireless signals from the network 190 over the communications link 392, and may convert the received signals into incoming traffic 324 in a format usable to the impairment engine 330. Similarly, the second NIU 328 may convert outgoing traffic 326 from the impairment engine 330 into the electrical, optical, or wireless signal format required to transmit the test traffic to the network 190 via the communications link 394.

For ease of discussion, the impairment unit 320 shown in FIG. 3 operates in a half-duplex manner, receiving packets over the communications link 392 and transmitting packet over the communications link 394. An impairment unit may operate in full-duplex manner, providing a bidirectional flow of packets between the communications links 392 and 394. A full-duplex impairment unit may use common hardware to process packets flowing in both directions. A full-duplex impairment unit may use separate hardware to process packets flowing in each direction, or a combination of common and separate hardware.

The impairment engine 330 may accept the incoming traffic 324 from the NIU 322 and may temporarily store incoming packets in the traffic memory 360. The impairment engine 330 may subsequently read stored packets from the traffic memory 360 to form the outgoing traffic 326. The impairment engine 330 may include logic to selectively impair at least some of the packets before transmission. For example, the impairment engine 330 may include logic to delay or reorder selected streams of packets by changing the relative order in which the packets are written into and read from the traffic memory. The impairment engine 330 may include logic to introduce jitter into selected streams of packets by altering the time intervals between transmissions of successive packets in the selected streams. The impairment engine 330 may include logic to impair selected streams by failing to read packets to be dropped from the traffic memory 360 or by reading packets to be duplicated from the traffic memory 360 more than once.

The impairment engine 330 may include a classifier 340 to classify packets within the incoming traffic 324 into a plurality of impairment classes. Each of the plurality of impairment classes may be uniquely associated with a corresponding one of a plurality of impairment profiles stored in a profile memory 350. The term "uniquely associated" means a one-to-one correspondence between impairment classes and impairment profiles. Each impairment profile may define one or more impairments to be applied to packets of the associated class. Each impairment profile may define both types of impairments and one or more parameters defining how each impairment is applied. For example, an impairment profile may define that the packets in the associated class should be delayed by a time period specified in the impairment profile, or that a specified portion of the packets in the associated class should be delayed until one or more subsequently-received packets of the same class have been transmitted (thus causing the packets within the class to be reordered). An impairment profile may define multiple impairments to be applied to a class. For example, an impairment profile may define that 1% of the packets in the associated class are reordered, 0.1% of the packets in the class are duplicated, and bit errors are introduced into 0.01% of the packet in the class. One of the plurality of impairment classes may be a default class for traffic that will not be impaired.

The profile memory 350 may be a contiguous block of memory such as random access memory. The profile memory 350 may be a plurality of registers, latches, or other memory circuits distributed within the impairment engine. The profile memory 350 may be a combination of random access memory, registers, latches, and other memory circuits.

The plurality of impairment profiles may be defined prior to a test session. For example, the plurality of impairment profiles may be defined by a test engineer using a test administrator computing device 310. The impairment profiles may be downloaded to the impairment unit 320 from the test administrator 310 before or during the test session. The plurality of impairment profiles may be stored in the profile memory 350 by the port CPU 325.

The classifier 340 may classify each incoming packet based on the contents of the packet. For example, the classifier 340 may filter or parse the header of each packet and determine the class of each packet based on information such as IP source and destination addresses, source and destination ports, protocol, quality or type of service, and other data that can be extracted from the packet header. However, classifying each packet based on the packet header content may require a substantial amount of processing, particularly since the header content may be modified during transmission though the network. Modifications such as the addition of MPLS labels and/or IP header option or extension fields may move the location of some or all header content with respect to the start of the packet. Thus classifying packets based on header content may require the impairment unit to completely parse the packet header.

The classifier 340 may classify each incoming packet based on information contained in the payload of the packet. For example, the classifier 340 may simply read an impairment class field within the payload of each packet. However, when testing a network, test traffic is commonly generated by test equipment such as the traffic simulator 100 or the generator/analyzer network cards 210. It may be impractical or infeasible to add an impairment class field to the payloads of packets generated by legacy test equipment. To maintain compatibility with legacy test equipment, the classifier 340 may determine the impairment class based on test information included in the payloads of some or all packets.

Figure 4:
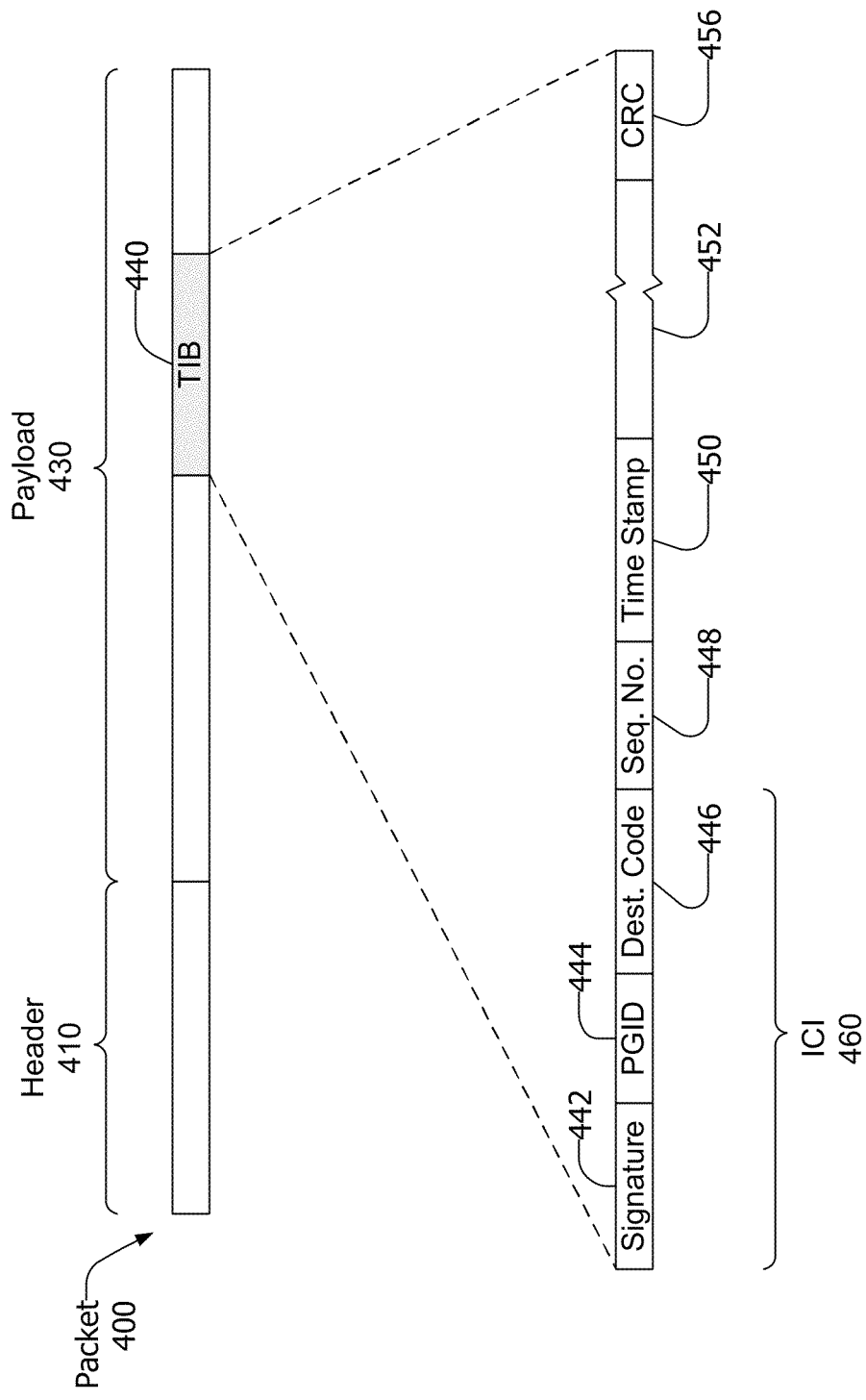
FIG. 4 is a graphical representation of a packet.

Referring now to FIG. 4, a packet 400 may be generated by a traffic generator, such as the traffic simulator 100 or the generator/analyzer network cards 210, during a test session. The packet 400 may include a header 410 and a payload 430. The payload 430 may include a test information block (TIB) 440. The TIB may contain information used to measure and document the performance of a network under test during the test session. The TIB 440 may include some or all of a signature 442, a packet group identification (PGID) 444, a destination code 446, a sequence number 448, a transmit time stamp 450, other information 452, and a cyclic redundancy check (CRC) 456. These data items may be arranged in any predetermined order to form the test information block.

The CRC 456 may be calculated over the TIB 440. The classifier 340 may use the CRC 456 to validate the information in the TIB 440.

The signature 442, if present, may be used to locate the TIB 440 within the packet 400. As described in published patent application US 2007/0115833 A1, the signature may have a predetermined value or a plurality of predetermined values defined for a particular test session. The classifier 340 may perform a floating pattern match to locate the signature, and thus the entire TIB 440, within each received packet.

In the absence of a signature within the TIB 440, the CRC 456 may be used to locate the TIB 440 within the packet 400. The classifier 340 may locate the TIB by calculating a CRC over a floating window (presumed to be the TIB) and comparing the calculated CRC to the value of the bytes at the end of the presumed TIB, as described in published patent application US 2006/0088060 A1. The TIB 440 may be located in some other manner. Once the TIB 440 is located, the classifier 340 may extract data items within the TIB as needed.

The PGID 444 may identify each received packet as a member of one of a plurality of packet groups. The destination code 446 may define a port that is the intended destination of the packet, or a plurality of ports in a multicast group that are intended destinations of the packet. As described in published patent application US 2011/0069620 A1, the destination code (termed a "destination signature" in that document) may be used to track packets that are misdirected by the network under test and arrive at incorrect destinations. The sequence number 448 may define each packet's position or order (at time of transmission) within the respective packet group. The time stamp 450 may define when each received packet was transmitted into the network under test.

Information indicative of the impairment class of a packet may be embedded within the TIB 440. In this context, the term "embedded" has its conventional meaning of "made an integral part of". Specifically, the impairment class of a packet need not be a separate field within the payload of each packet, but rather may be placed or encoded within existing fields within the TIB. For a very simple example, the four most significant bits of the PGID may be used to indicate the impairment class of a packet. In a more flexible and useful example, impairment class information (ICI) 460 may be embedded within all or portions of the signature 442, the PGID 444, and the destination code 446. The classifier 340 may determine the impairment class of a received packet by processing these or other fields of the TIB 440.

Figure 5:
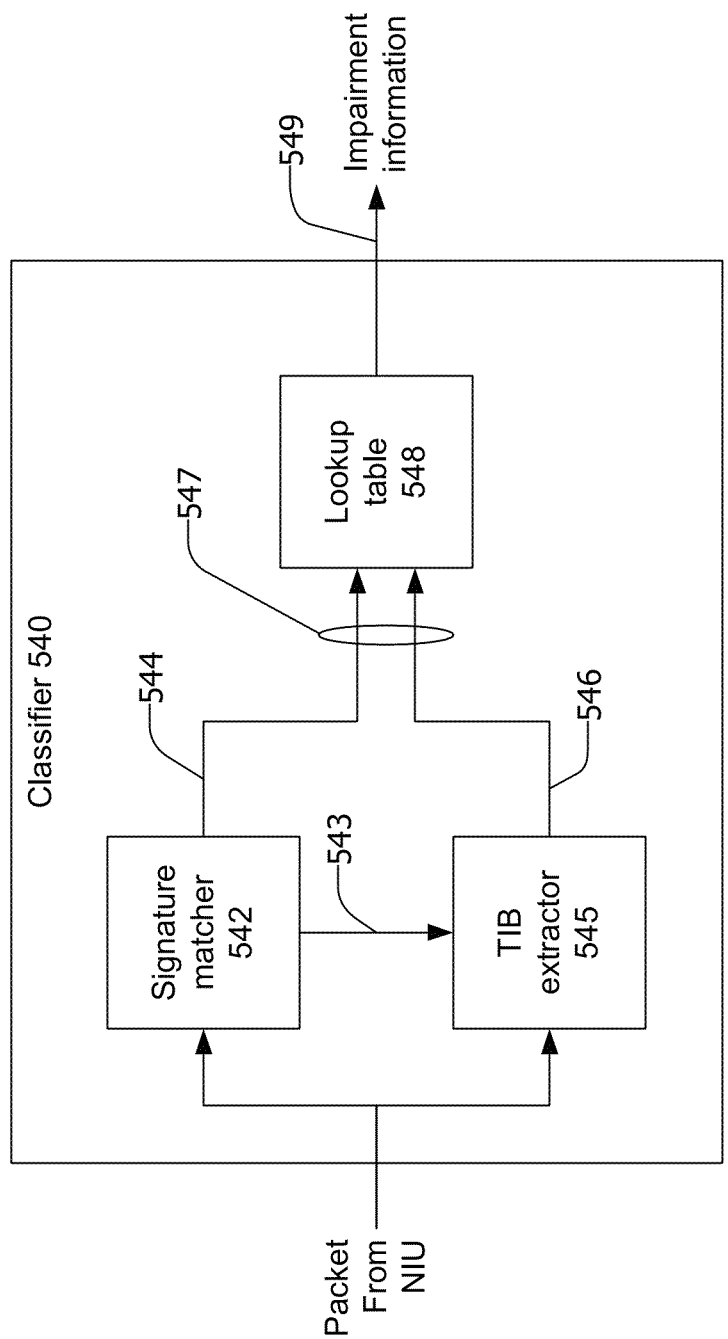
FIG. 5 is a block diagram of a classifier.

Referring now to FIG. 5, an exemplary classifier 540 may be suitable for use as the classifier 340 in FIG. 3. The classifier 540 may determine an impairment class for a packet received via a network interface unit such as the NIU 322. The classifier 540 may include a signature matcher 542 to locate a signature field within the packet. The signature matcher 542 may include comparison circuits to compare a floating window within the packet to one or more predetermined signature values. The signature matcher 542 may provide an output 543 indicating that one of the predetermined signature values has been found within the packet. In the case where floating window is compared to a plurality of predetermined values, the signature matcher 542 may output an index 544 indicating which of the predetermined values was located within the packet.

The classifier 540 may include a TIB extractor 545 that, when the signature matcher has located the signature field within the packet, extracts at least a portion of the test information block. The extracted portion 546 may include at least all or part of a PGID field from the TIB. The extracted portion 546 may include all or part of other fields of the TIB, such as all or part of a destination code or all or part of a sequence number.

The index 544 output from the signature matcher 542 and the extracted portion 546 of the TIB may collectively form a pointer 547 or address to access a lookup table 548 that stores impairment information. For example, the lookup table 548 may be logically organized as plurality of pages, where the index 544 may point to a specific page, and the extracted portion 546 may point to an entry within the selected page. The impairment information 549 read from the lookup table 548 may be or include an impairment class for the packet received from the NIU. The impairment information 549 may additionally include one or more parameters that define an extent or degree to which the packets of an impairment class should be impaired. For example, if the impairment class included in the impairment information 549 is associated with an impairment profile that requires packets to be reordered, the impairment information 549 may also include a parameter that specifies what portion of the packets in the class should be reordered.

Referring back to FIG. 3, the classifier 340 may determine an impairment class for every received packet based on the content of the TIB contained within the packet. The impairment class determined by the classifier 340 may then be used as an index to retrieve the associated impairment profile from the profile memory 350. The impairment engine 330, in conjunction with the traffic memory 360, may then process each packet in accordance with the impairment class of the packet.

It should be understood that the phrase "process each packet" does not mean or imply that every packet is actually impaired. For example, if an impairment profile requires the introduction of bit errors into 0.01% of the packets in a corresponding impairment class, the impairment engine 330 may maintain a count of the received packets in the impairment class and cause a bit error in every 10,000$^{th}$ packet. The other packets in the impairment class may be retransmitted from the impairment unit without change.

Description of Processes

Figure 6:
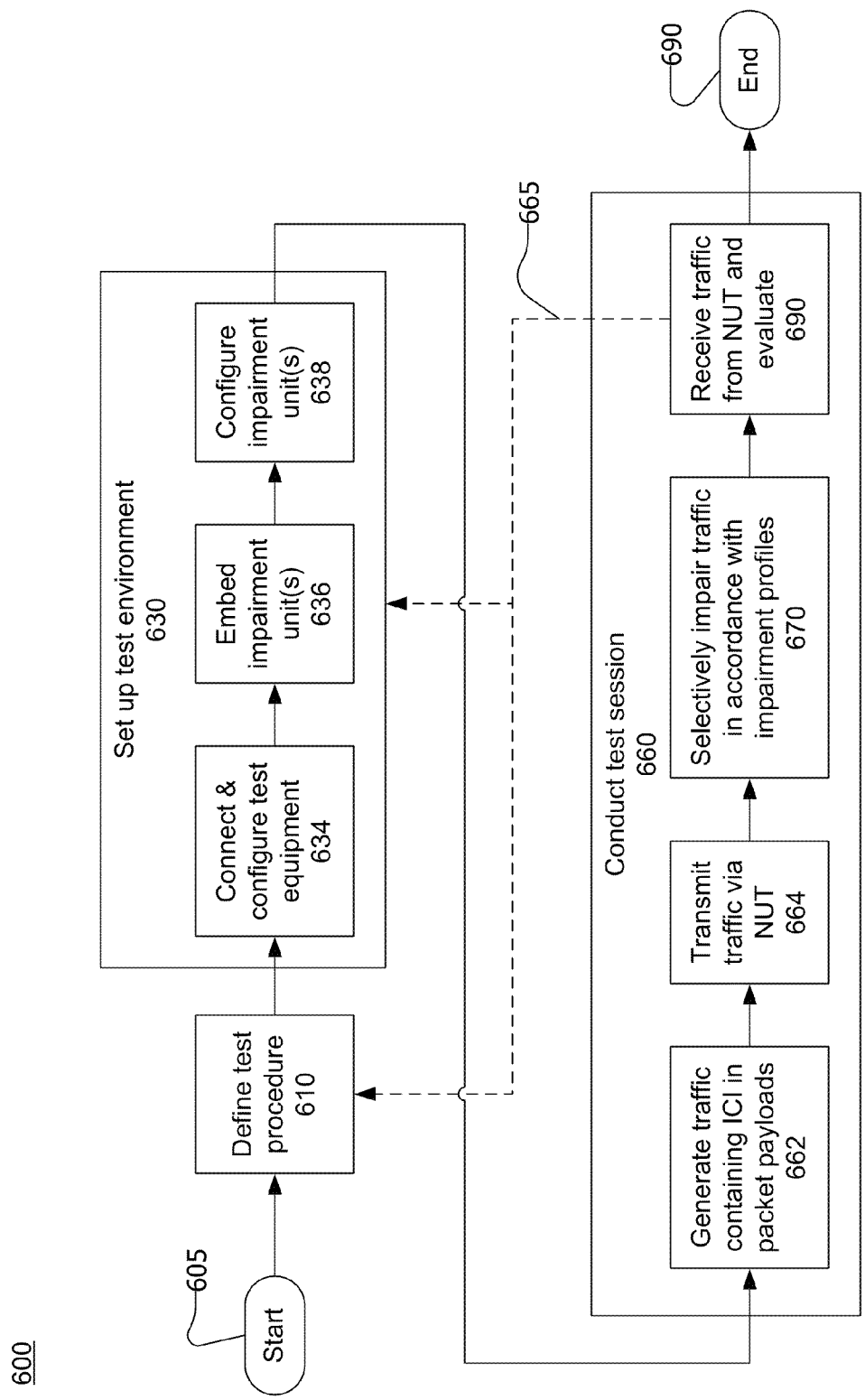
FIG. 6 is a flow chart of a process for testing a network.

FIG. 6 is a flow chart of a process 600 for testing a network under test (NUT). For ease of discussion, the process 600 is shown to start at 605, to end at 690, and to proceed through three generally sequential phases 610, 630, and 660. At 610, a test procedure may be defined. At 630, a test environment may be set up in accordance with the test procedure defined at 610. At 660, a test session may be conducted in accordance with the test procedure. When conducting the test session, actions 662-690 may be performed essentially in parallel over an extended time period. The process 600 may be, to at least some extent, cyclic. For example, test results 665 may be used to modify the test procedure and/or the configuration of test equipment and/or impairment units during a test session.

Figure 7:
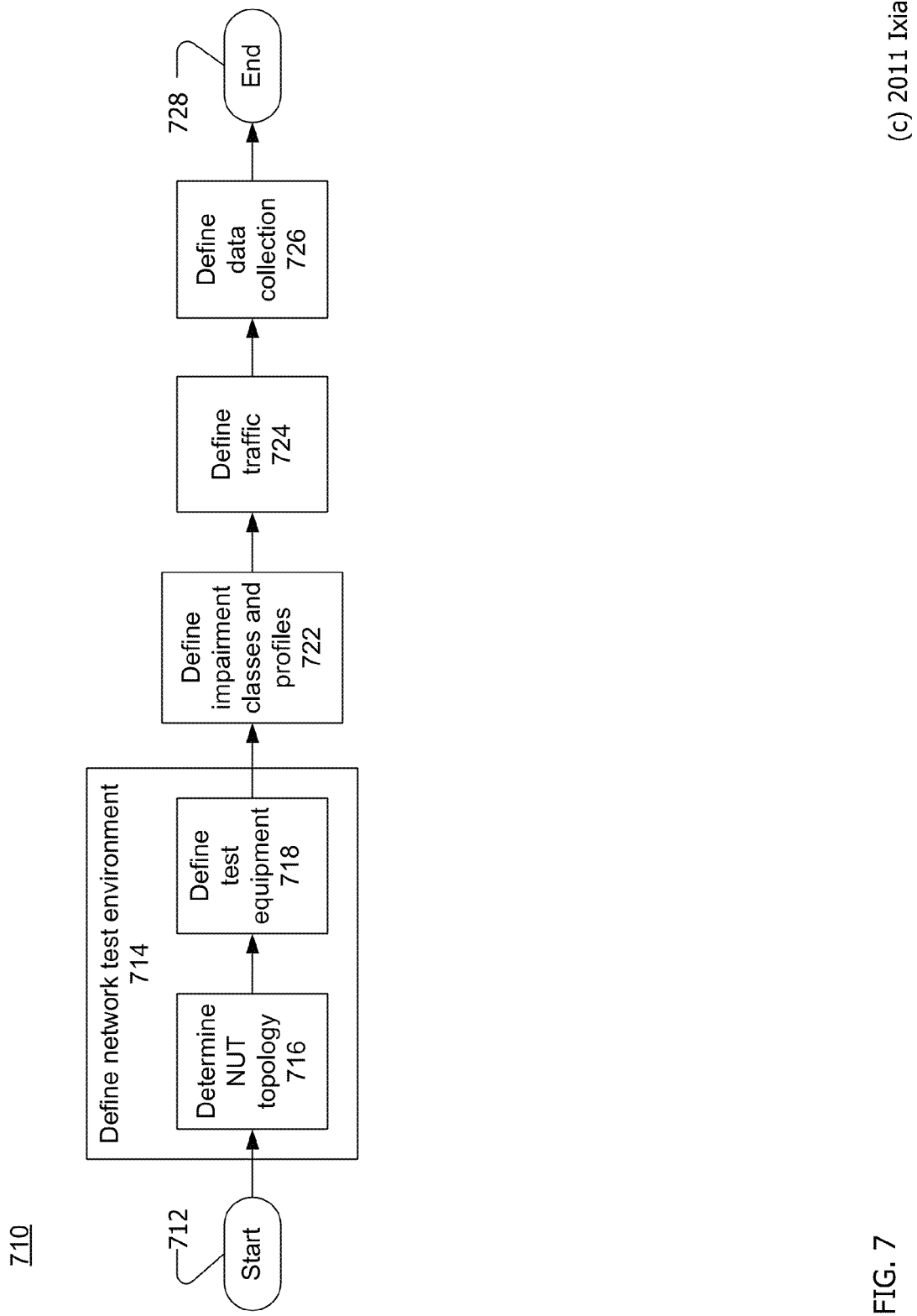
FIG. 7 is a flow chart of a process for designing a test procedure.

Referring now to FIG. 7, a process 710 for defining a test procedure may be suitable for use at 610 in the process 600. The process 710 may be performed, for example, by a test administrator computing device, such as the test administrator 310, coupled to one or more network cards, such as the generator/analyzer network cards 210. The test administrator may also be coupled to one or more impairment units, such as the impairment unit 120 and/or the impairment unit network card 220. The test administrator computing device may be controlled by one or more test engineers or other operators. The test engineers or other operators may, for example, use a graphical user interface to the test administrator to provide inputs to an automated software tool to perform at least part of the process 710.

The process 710 may start at 712 and continue through generally sequential actions to end at 728. The process 710 is exemplary, and these or other actions may be performed in different order to design a test procedure.

The initial actions of the process 710 may be to define a network test environment at 714. Defining the network test environment may include determining the topology of the network under test (NUT) at 716. Once the network topology is defined, the test equipment may be defined at 718. Defining the test equipment at 718 may include determining how many test ports will be involved in the test session, where each test port will connect to the network, and what test equipment will be required to execute the test procedure. Defining the test equipment at 718 may also include defining what each test port will emulate during the test session. Each test port may emulate as little as a single IP address and as much as an entire network encompassing a large plurality of IP addresses. Additionally, defining the test equipment at 718 may include defining control packets that will advertise each test port to routers, switches, and other devices within the network using one or more routing protocols such as Border Gateway Protocol, Exterior Gateway Protocol, Open Shortest Path First Protocol, Resource Reservation Protocol and other routing protocols.

Defining the test equipment at 718 may include defining one or more impairment units, such as the impairment units 120 or 220, that be embedded into the NUT. The location of each impairment unit (along which network path) within the NUT may also be defined at 718.

Once the network test environment is defined at 714, how each impairment unit will impair traffic flowing along the respective network path may be defined at 722. For each impairment unit, a plurality of impairment classes may be defined for the traffic flowing along the respective network path, and a corresponding impairment profile may be defined for each impairment class. The impairment classes and impairment profiles may be individually defined for each of a plurality of impairment units, or may be common to all impairment units.

The test traffic to be generated during the test session may be defined at 724. Test traffic may be defined before, concurrently with, and/or after impairment classes and profiles are defined. The test traffic may include one or more traffic items. Each traffic item may effectively be a separate test of the network. Each traffic item may be defined as a plurality of streams. Each stream may be described by stream data that defines attributes of the stream such as source port; transmission frequency; fixed and variables fields of the packets in the stream such as, for example, protocol or type of packet, source and destination IP addresses, type of service, and payload content; and other characteristics of each packet in the stream. Each stream may include a plurality of flows or packet groups. An extensive test of a complex network may include thousands of streams comprising a million or more flows.

Each flow may include a plurality of sequentially-transmitted packets. A payload portion of each packet may include a test information block such as the TIB 440 in FIG. 4. The test information block may include a signature and a packet group identifier (PGID) that may be defined at 724. When a test procedure includes tracking misdirected packets, the test information block of some or all packets may also include a destination code defined at 724. The signatures, PGIDs, and destination codes defined at 724 may be coordinated with the impairment classes defined at 722, such that impairment class information (ICI) indicative of the impairment class of each packet is embedded within the test information block of each packet.

At 726, the data to be collected during the test session may be defined, including what test data will be collected and how collected test data will be stored. How test data will be combined or aggregated for reporting and presentation may also be defined, to at least some extent, at 726.

Returning now to FIG. 6, once a test procedure has been defined at 610, the test environment may be set up at 620. Setting up the test environment may include, at 634, connecting the test equipment to the network and configuring the test equipment in accordance with the test procedure defined at 610. Configuring the test equipment may include, for example, downloading instructions to a plurality of network cards, such as the generator/analyzer network cards 210, to generate test traffic in accordance with the test procedure. The instructions downloaded to the network cards may also include instructions to collect and store traffic statistics and other data in accordance with the test procedure.

At 636, one or more impairment units may be embedded in the NUT. Each impairment unit may be inserted into a respective selected communications path within the NUT. Effectively, each selected communications path may be disconnected or broken and the two sides of the broken communications path may be connected to two ports on the respective impairment unit. Impairment units, such as the impairment unit 120, may be located within the NUT, remote from some or all of the other test equipment used to conduct the test session. Impairment units, such as the impairment unit network card 220, may be co-located with some or all of the other test equipment.

At 638, each of the one or more impairment units may be configured. Configuring each impairment unit may include downloading one or more impairment profiles indicating how each impairment unit should impair a corresponding plurality of impairment classes of network traffic. Configuring each impairment unit may also include downloading a lookup table that allows each impairment unit to determine the impairment class of received packets based on test information contained in the payload of each packet. When two or more impairment units are embedded in the network, the impairment profiles and lookup tables downloaded to the impairment units may be the same or different.

After a test procedure has been defined at 610 and a test environment has been set up at 630, a test session may be conducted at 660. Conducting the test session may include generating traffic in accordance with the test procedure at 662. The traffic generated at 662 may include one or more traffic items, each of which may be composed of a plurality of streams encompassing a larger plurality of flows and an even larger plurality of packets. Some or all of the packets generated at 662 may include a test information block, such as the TIB 440. Each test information block may include a signature field and a packet group identifier and some or all of a destination code, a sequence number, a timestamp, and a cyclic redundancy check field. Impairment class information (ICI) indicative of an impairment class of each packet may be embedded with each test information block. The traffic generated at 662 may be transmitted via the NUT at 664.

At 670, one or more impairment units, which were embedded in respective communications paths within the NUT at 636, may selectively impair traffic along the respective communications paths. The impairment units may impair traffic in accordance with impairment profiles and other configuration data downloaded to each impairment unit at 638 which, in turn, may be in accordance with the test procedure defined at 610. Each impairment unit may impair traffic selectively by classifying packets received at the impairment unit into a plurality of impairment classes and then impairing the traffic within each impairment class according to an associated impairment profile. Each impairment unit may classify received packets based on impairment class information embedded within a test information block contained in the payload of some or all packets. Each impairment unit may impair traffic by selectively dropping, delaying, reordering, duplicating, and/or altering at least some packets that flow along the respective communications path, as specified in the corresponding impairment profile. Only a portion of the packets within each impairment class may actually be impaired.

When two or more impairment units are embedded in the network, the impairment units may function independently from each other. A flow that transits two or more impairment units may be impaired by more than one impairment unit.

At 690, some or all of the traffic transmitted at 664 may be received and evaluated after transiting the NUT. A portion of the traffic received at 690 may have been impaired at 670. At 690, evaluating the received traffic may include collecting traffic statistics; filtering, sorting, and aggregating the collected traffic statistics; and reporting test results. Test results may be reported as printed documents, as display screens on a user interface, or in some other manner. Reporting test results may be interactive. For example, a test engineer or other operator may use a graphic user interface to select specific results to be reported and to specify how results should be processed. Test results 665 may be used, either automatically or with operator participation, to alter the test procedure and/or the configuration of the test environment.

Figure 8:
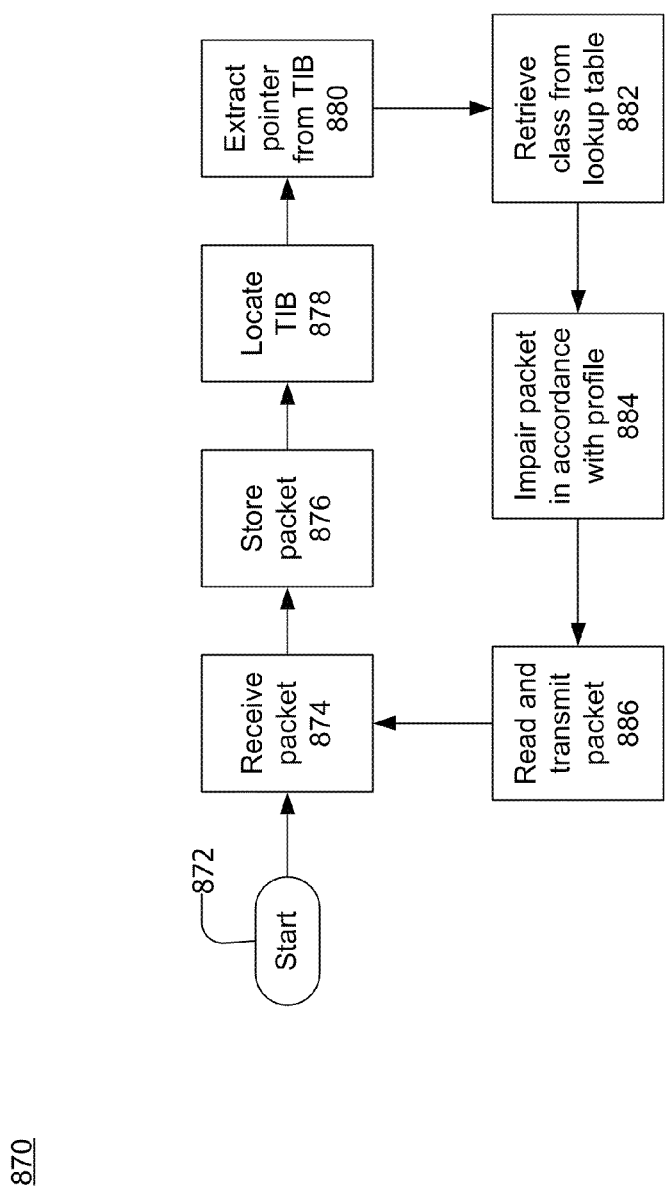
FIG. 8 is a flow chart of a process for selectively impairing network traffic.

Referring now to FIG. 8, a process 870 for selectively impairing network traffic may be suitable for use at 670 in the process 600. The process 870 may be performed by an impairment unit such as the impairment unit 120 or the impairment unit network card 220. The process 870 assumes that the impairment unit is inserted into a communications path within a network, and that the impairment unit has already been configured as previously described.

The process 870 may start at 872, for example when a test session is initiated, and may continue cyclically until the test session is complete. For ease of discussion, the process 870 is illustrated as a sequence of actions performed on a single packet. It should be understood that the process 870 may be performed as a pipeline such that multiple actions are performed in parallel on different packets, and that the process 870 may be performed simultaneously and independently by a plurality of impairment units.

At 874, a packet may be received. At 876, the received packet may be stored in a memory such as the traffic memory 360. For long packets, storing the packet at 876 may commence while the packet still being received at 874.

At 878, a test information block (TIB) may be located within the received packet. The TIB may be located, for example, by searching the received packet for a field that matches one of one or more predetermined signature values, as previously described. The TIB may be located in some other manner. Locating the TIB at 878 may be performed before, concurrently with, or after the packet is stored at 876.

After the TIB is located at 878, a pointer may be extracted from the TIB at 880. Extracting the pointer from the TIB may involve selecting all or portions of one or more fields of the TIB and/or applying one or more masks to select specific bits from the selected fields. Extracting the pointer from the TIB may involve comparing a portion of the TIB to a plurality of predetermined values and providing an index indicating which predetermined value was found within the TIB. The pointer may include the index, all or portions of one or more fields from the TIB, and other data developed from the content of the TIB.

The pointer extracted from the TIB at 880 may be used to retrieve an entry from a lookup table at 882. The retrieved entry may include an impairment class for the received packet and, optionally, one or more parameters indicating how the packet should be processed by the impairment unit.

At 884, the received packet may be impaired as appropriate for the impairment class retrieved at 882. The impairment unit may store an impairment profile (which may have been downloaded to the impairment unit when the impairment unit was configured) associated with each impairment class. Each impairment profile may indicate what, if any, impairments should be applied to the corresponding impairment class. Each impairment profile may also specify a portion of the packets in the impairment class to receive each indicated impairment. For example, an impairment profile may require the all of the packets in the associate impairment class be delayed, but only a small portion of the packets in class dropped, altered, or duplicated. To determine whether or not an impairment should be applied to a specific received packet, the impairment unit may maintain a cumulative count of the number of packets received for each impairment class.

The packet previously stored at 876 may be read from memory and transmitted into the NUT at 886. Impairing the packet at 884 may be performed as the packet is stored at 876 and/or as the packet is read at 886. For example, a packet to be dropped may not be stored at 876, or may be stored at 876 and never read at 886. A packet to be duplicated may be stored once at 876 and read twice at 886. Packets may be altered, if required, prior to storage at 876 or after being read at 886. Packets to be delayed may be held in memory for a specified time period. Packets to be re-ordered may be stored at 876 and read at 886 in different order. To facilitate impairing packets as or after they are read at 886, metadata associated with each packet may be stored at 876. The metadata associated with a packet may include, for example, flags or codes indicating alterations to be made to the packet before transmission, a timestamp and/or a sequence number indicating when the packet should be read and transmitted at 886, and other information.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An impairment unit, comprising:
    a first network interface to receive network traffic from a network, the received network traffic comprising a plurality of received packets;
    a classifier configured to determine an impairment class of each received packet, the impairment class of each received packet being one of a plurality of impairment classes, each impairment class uniquely associated with a corresponding one of a plurality of impairment profiles that define one or more impairments to be applied to packets of the associated impairment class, the classifier comprising:
        a signature matcher to locate a test information block within the payload of each received packet, and
        an extractor to extract a portion of the test information block indicative of the impairment class of each received packet;
    an impairment engine configured to impair each of the plurality of impairment classes in accordance with the corresponding impairment profile to provide impaired network traffic; and
    a second network interface to transmit the impaired network traffic to the network.

2. The impairment unit of claim 1, wherein
    the classifier includes a lookup table storing impairment information, and
    the classifier is configured to use the extracted portion of the test information block as a pointer to retrieve the impairment class of each received packet from the lookup table.

3. The impairment unit of claim 2, wherein the extracted portion of the test information block includes all or a portion of a packet group identifier.

4. The impairment unit of claim 2, wherein
    the test information block includes a signature field, and
    the signature matcher locates the signature field by comparing a floating window within the packet to one or more predetermined signature values.

5. The impairment unit of claim 4, wherein the classifier locates the test information block based on a location of the signature field.

6. The impairment unit of claim 4, wherein
    the signature matcher compares the floating window to a plurality of predetermined signature values,
    the signature matcher outputs an index indicating which of the plurality of predetermined signature values was located within the packet, and
    the index is used as a portion of the pointer to retrieve the impairment class of each received packet from the lookup table.

7. The impairment unit of claim 2, further comprising:
    an interface to receive the impairment information from a test manager computing device.

8. The impairment unit of claim 7, further comprising:
    a processor to receive the impairment information via the interface and store the impairment information in the lookup table.

9. A method of emulating network impairments, comprising:
    receiving network traffic by an impairment unit embedded in a communications path with a network, the received network traffic comprising a plurality of received packets;
    determining an impairment class of each received packet, the impairment class of each received packet being one of a plurality of impairment classes, each impairment class uniquely associated with a corresponding one of a plurality of impairment profiles that define one or more impairments to be applied to packets of the associated impairment class, determining an impairment class further comprising:
        matching a signature to locate a test information block within the payload of each received packet, and
        extracting a portion of the test information block indicative of the impairment class of each received packet;
    impairing each of the plurality of impairment classes in accordance with the corresponding impairment profile to provide impaired network traffic; and
    transmitting the impaired network traffic to the network.

10. The method of claim 9, wherein determining an impairment class of each received packet further comprises:
    using the extracted portion of the test information block as a pointer to retrieve the impairment class of each received packet from a lookup table storing impairment information.

11. The method of claim 10, wherein the extracted portion of the test information block includes all or a portion of a packet group identifier.

12. The method of claim 10, wherein
    the test information block includes a signature field, and the method further comprises the classifier locating the signature field by comparing a floating window within the packet to one or more predetermined signature values.

13. The method of claim 12, further comprising:
locating the test information block based on a location of the signature field.

14. The method of claim 12, wherein locating the signature field further comprises:
comparing the floating window to a plurality of predetermined signature values;
generating an index indicating which of the plurality of predetermined signature values was located within the packet; and
using the index as a portion of the pointer to retrieve the impairment class of each received packet from the lookup table.

15. The method of claim 10, further comprising:
receiving the impairment information from a test manager computing device.

16. The method of claim 15, further comprising:
storing the received impairment information in the lookup table.

17. A machine readable storage medium storing programming code that, when used to program a programmable circuit device, configures the programmable circuit device to include:
a first interface to receive network traffic, the received network traffic comprising a plurality of received packets
a classifier configured to determine an impairment class of each received packet, the impairment class of each received packet being one of a plurality of impairment classes, each impairment class uniquely associated with a corresponding one of a plurality of impairment profiles that define one or more impairments to be applied to packets of the associated impairment class, the classifier comprising:
a signature matcher to locate a test information block within the payload of each received packet, and
an extractor to extract a portion of the test information block indicative of an impairment class of each received packet;
an impairment engine configured to impair each of the plurality of impairment classes in accordance with the corresponding impairment profile to provide impaired network traffic; and
a second network interface to transmit the impaired network traffic to the network.

18. The machine readable storage medium of claim 17, wherein
the classifier includes a lookup table storing impairment information, and
the classifier is configured to use the extracted portion of the test information block as a pointer to retrieve the impairment class of each received packet from the lookup table.

19. The machine readable storage medium of claim 18, wherein the extracted portion of the test information block includes all or a portion of a packet group identifier.

20. The machine readable storage medium of claim 18, wherein
the test information block includes a signature field
the signature matcher locates the signature field by comparing a floating window within the packet to one or more predetermined signature values.

21. The machine readable storage medium of claim 20, wherein
the classifier locates the test information block based on a location of the signature field.

22. The machine readable storage medium of claim 20, wherein
the signature matcher compares the floating window to a plurality of predetermined signature values,
the signature matcher outputs an index indicating which of the plurality of predetermined signature values was located within the packet, and
the index is used as a portion of the pointer to retrieve the impairment class of each received packet from the lookup table.

23. The machine readable storage medium of claim 18, further comprising:
an interface to receive the impairment information from a test manager computing device.

* * * * *